United States Patent

Pedersen

[11] Patent Number: 5,997,058
[45] Date of Patent: Dec. 7, 1999

[54] BUMPER, AND THE FABRICATION THEREOF

[75] Inventor: Roald Pedersen, Gjøvik, Norway

[73] Assignee: Norsk Hydro ASA, Oslo, Norway

[21] Appl. No.: 09/117,158

[22] PCT Filed: Jan. 14, 1997

[86] PCT No.: PCT/NO97/00011

§ 371 Date: Jul. 24, 1998

§ 102(e) Date: Jul. 24, 1998

[87] PCT Pub. No.: WO97/27082

PCT Pub. Date: Jul. 31, 1997

[30] Foreign Application Priority Data

Jan. 24, 1996 [NO] Norway .................................... 960288

[51] Int. Cl.$^6$ .................................................. B60R 19/02
[52] U.S. Cl. ........................... 293/102; 293/121; 293/122
[58] Field of Search ................................... 293/102, 121, 293/122

[56] References Cited

U.S. PATENT DOCUMENTS

| 1,985,113 | 12/1934 | Smith | 293/122 |
| 4,408,790 | 10/1983 | Shimoda et al. | 293/122 |
| 4,961,603 | 10/1990 | Carpenter | 293/102 |
| 5,462,325 | 10/1995 | Masuda et al. | 293/102 |
| 5,722,708 | 3/1998 | Jonsson | 293/102 |
| 5,799,991 | 9/1998 | Glance | 293/121 |

FOREIGN PATENT DOCUMENTS

| 2531022 | 2/1984 | France | 293/102 |
| 403279049 | 12/1991 | Japan | 293/102 |

*Primary Examiner*—Joseph D. Pape
*Assistant Examiner*—Kiran Patel
*Attorney, Agent, or Firm*—Wenderoth, Lind & Ponack, L.L.P.

[57] ABSTRACT

A structural beam or bumper, especially for a vehicle, including en elongated profile which upon collision is adapted for absorbing collision energy and forces. The bumper is prepared from a complete and hollow blank and is further provided with different cross sections along its more or less arched extension. Also, for the purpose of providing a structural beam or bumper bar which renders possibilities for rational and structural sturdy attachment to the frame of the vehicle, the bumper (1), has a substantially unchanged basic cross section (2) at each side of the center (V—V), an outwardly pressed cross section (3) at the center (V—V) in relation to the basic cross section (2), as well as a compressed or folded cross section (4) at the areas of each terminal portion.

13 Claims, 5 Drawing Sheets

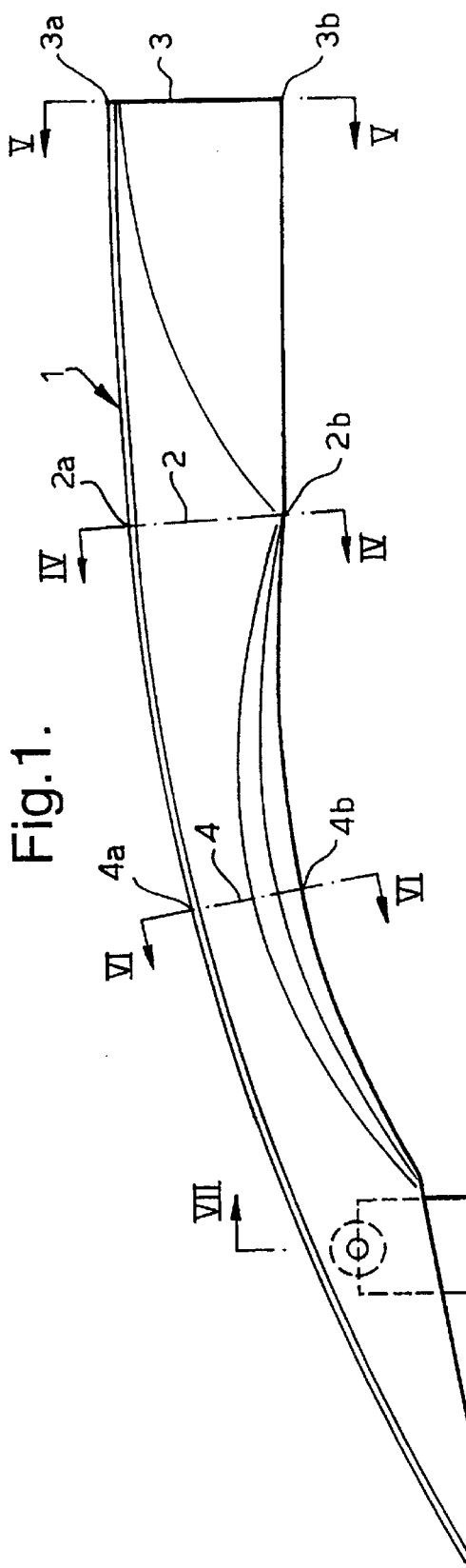
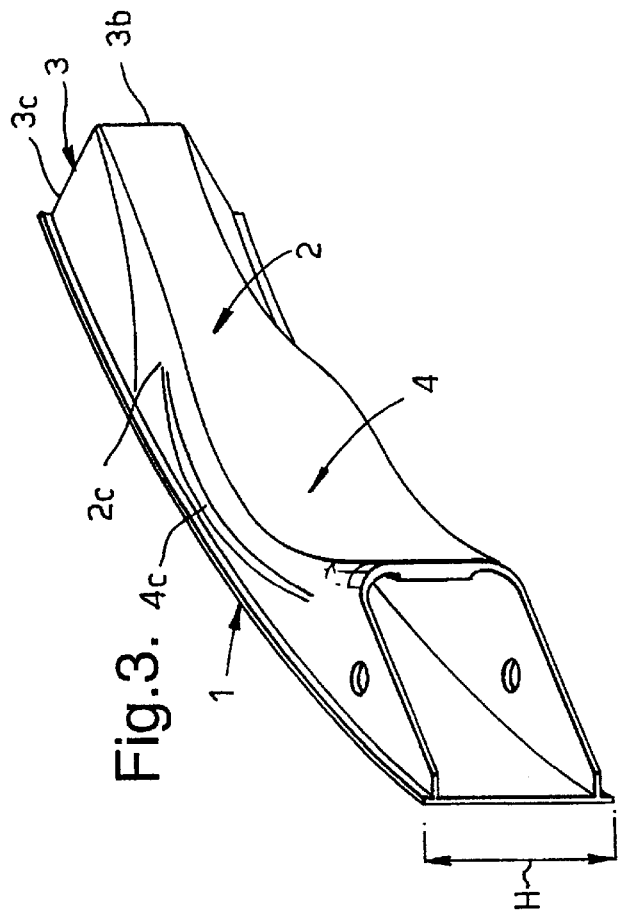

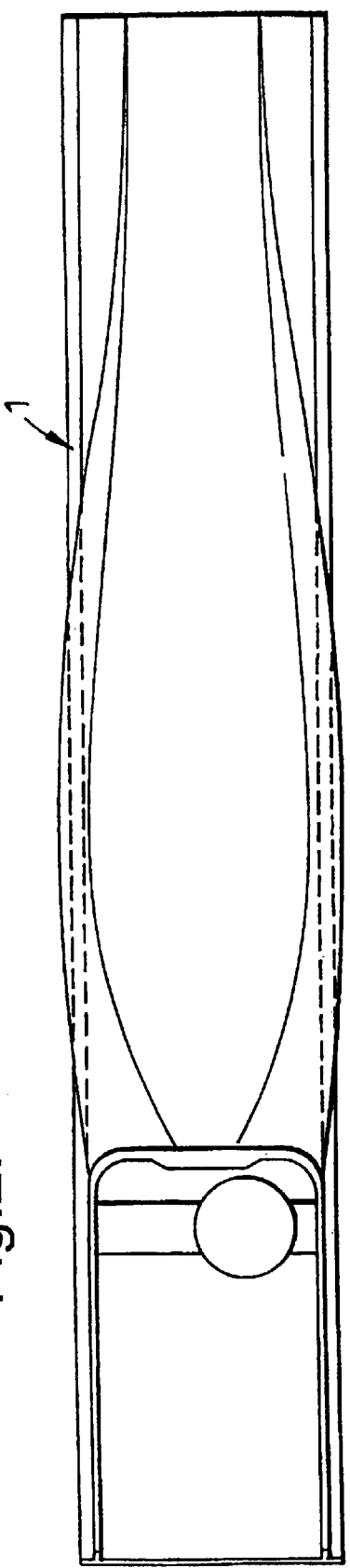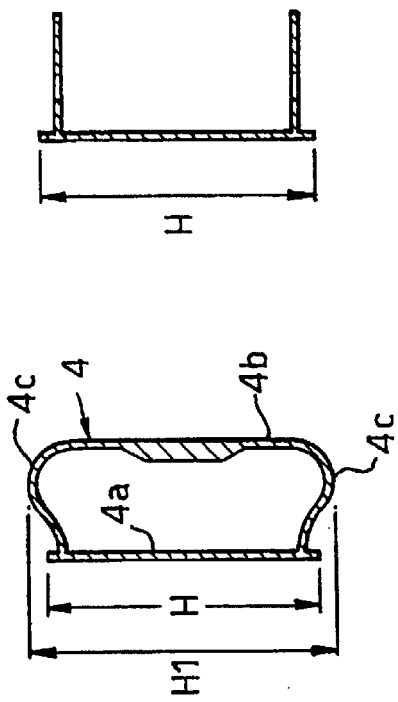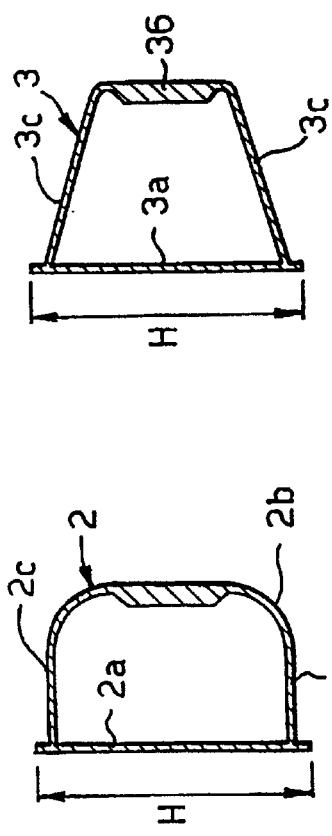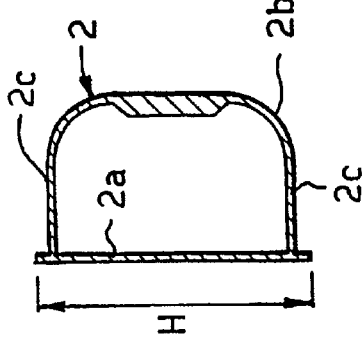

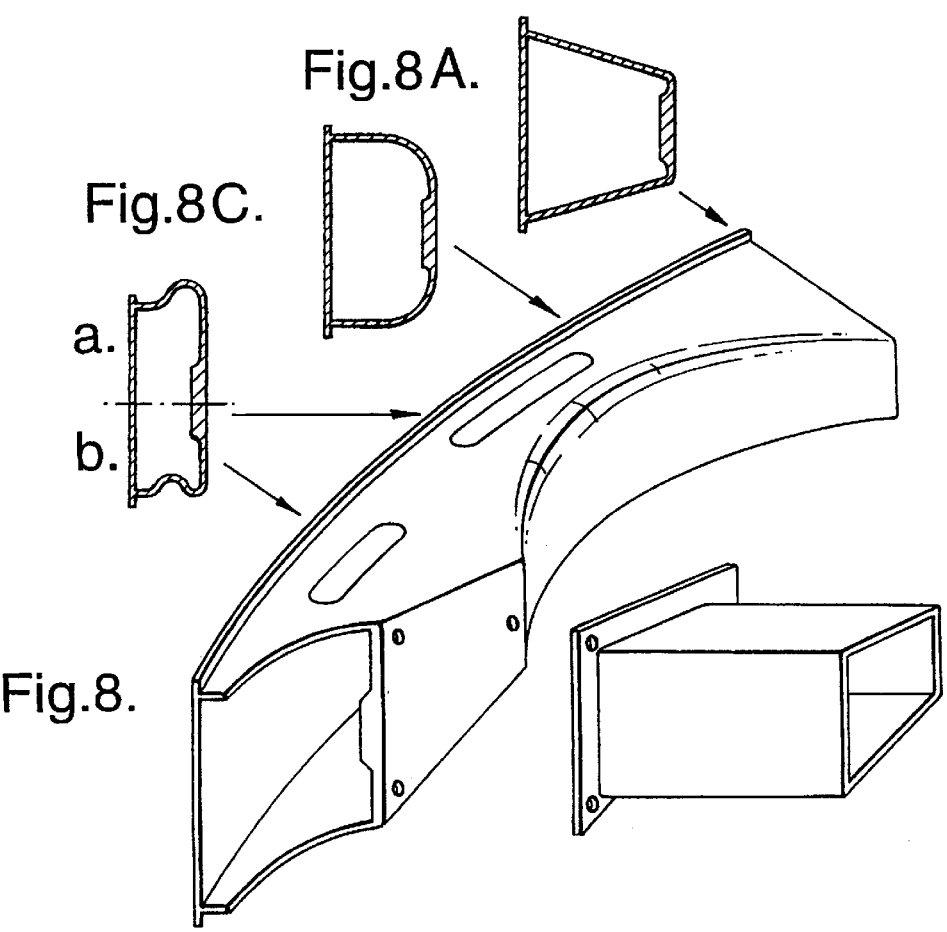

Fig.10.
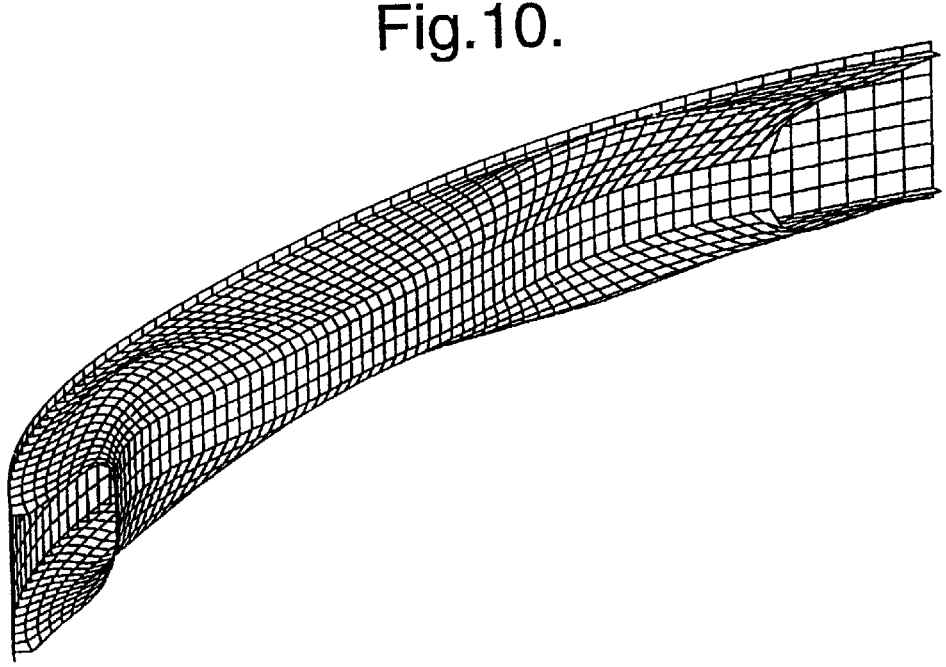
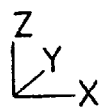
Fig.11.
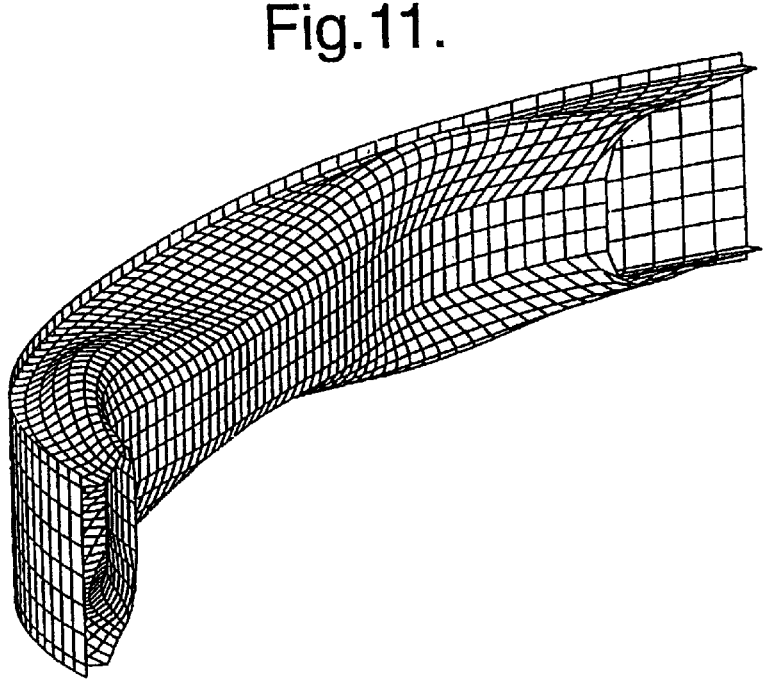
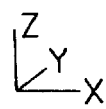

BUMPER, AND THE FABRICATION THEREOF

BACKGROUND OF THE INVENTION

1. Field of the Invention

The present invention relates to a structural beam, or bumper, especially for a vehicle, comprising an elongated profile which, upon collision, is adapted for absorbing collision energy and forces. The bumper is prepared from a complete and hollow blank and is further provided with different cross sections along its more or less arched extension.

The invention also relates to a method of fabricating such a structural beam or bumper.

2. Description of the Related Art

EP 0 602 138 B1 (Norsk Hydro/Clausen) discloses a structural beam, especially for use in a vehicle frame. The structural beam is constituted by an integrated unitary extruded forming piece having a closed cross section, which, along its length, defining a hollow space having variable cross sectional surfaces.

SUMMARY OF THE INVENTION

The present invention is directed to the task of providing a bumper which combines the protection of a vehicle and the persons in the vehicle upon collision.

Further, the invention has for its objective to provide a bumper which excels in high torsional stiffness, combined with great bending softness.

A further objective of the present invention is to provide a bumper rendering the possibility of structural sturdy attachment to the frame of the vehicle.

An object of the present invention is also to provide an elastic and relatively slender structural beam or bumper which, in relation to previously known profile based, closed bumpers, may absorb more elastic bending energy in relation to the quantity of material used.

Further, the present invention relates to a method which renders a efficient production of bumpers, the method at the same time being specifically favorable for high rate forming in a production line.

These and other objects are achieved in a bumper, which is characterized in that the structural beam or bumper has a substantially unchanged cross section on each side of the center, an outwardly pressed cross section at the center in relation to the basic cross section, as well as a compressed or folded cross section at the areas of each of the terminal portions.

Consequently, by starting with a basic cross section which is kept unchanged on each side of the center, at the same time as the center portion is processed into an outwardly pressed cross section at the center, and at the same time as the terminal portions are processed into a compressed or folded cross section, there is achieved a particularly favorable varying cross section rendering a specifically favorable resilient effect upon collision at velocities up to 4 km/h. Also, at velocities above 4 km/h, the structural beam in the form of a bumper has good collision qualities, since the overall profile can absorb more energy even at a lower weight, in comparison to corresponding bumper rails.

Additionally, there is achieved very favorable torsional stiffness, by maintaining the hollow chamber profile and by processing the bumper blank as a single item.

A specific embodiment of such a bumper may include the cross section at each side of the center comprises an outer wall portion, an arched inner wall portion, as well as yoke portions extending substantially perpendicularly from the outer wall portion so that the cross section at the center has a substantially trapeze shaped cross section comprising an outer wall portion having substantially the same height as the intermediate cross section and an inner wall portion of lesser height, as well as substantially slanted yoke portions extending therebetween, and that the cross section at each of the terminal portions has an outer wall portion having substantially the same height as the intermediate cross section and an inner wall portion having larger, equal or less height and having intermediate, arched or wavy yoke portions.

The trapeze shaped cross section at the center can then, by simple processing of the original yoke portions and the arched surfaces of the inner wall, be given a predetermined shape. The basic cross section at each side of the center will allow for easier manipulation of the shape of the product. Further, with the basic cross section on each side of the center, it is possible to undertake a controlled compression for folding of the areas at each of the terminal portions, so that the latter constitute the more slender parts of the bumper.

Further, it is appropriate that this type of bumper comprises a closed cross section having a front wall portion, a rear wall portion and intermediate yoke portions. The front and rear portions have a relatively large wall thickness compared to the wall thickness of the intermediate yoke portions.

Further, it is to be understood that the front wall portion can be substantially straight, or can be provided with a more or less contoured shape.

Further appropriately, the terminal portions may be so prepared that they merge into attachment portions which are provided with individual parallel surfaces, opposing an associated side beam for attachment thereto.

Further, it is to be understood that the bumper may be prepared substantially symmetrically about a central plane extending in the longitudinal direction of the car, and can be provided with an outer mantle of plastic material.

A method for manufacturing a structural beam or bumper of the type as described above will involve starting off with an extruded profile having a given basic cross section and by the further processing of this profiled blank such that the latter basic cross section is maintained on each side of the center. In the area of the center, the basic cross section is processed to a more or less protruding cross section at the same time as the profile at the terminal portions is processed to a more compressed or folded cross section.

More specifically the method includes starting off with a cross section which at each side of the center has an intermediate cross section comprising an outer wall portion, an arched inner wall portion, and yoke portions extending substantially perpendicularly from the outer wall portion. The cross section at the center is processed by substantially outwardly pressing the yoke portion in order to provide a substantially trapeze shaped cross section comprising an outer wall portion having substantially the same height as the intermediate cross section and an inner wall portion of smaller height, as well as substantially inclined yoke portions therebetween. At the terminal portions the intermediate cross section is processed into an outer wall portion having substantially the same height as the intermediate cross section and an inner wall portion having larger, equal or less height. And, the intermediate yoke is processed so as to bulge or bend outwardly in relation to the outer wall portion.

It is further appropriate that the extruded blank, which has a closed cross section and a front wall portion and a rear wall portion, as well as intermediate yoke portions, also has front and rear wall portions having a relatively larger wall thickness than the intermediate yoke portions. The front wall portion may be substantially straight, or have a more or less contoured form.

Appropriately, the terminal portions may be further processed or simultaneously processed to comprise attachment portions which are provided with a net parallel surface related to appropriate side beams of the vehicle.

Further appropriately, the method is directed to manufacturing a bumper profile which is substantially symmetrical about a center plane extending in the longitudinal direction of the car. The finished bumper will be provided with an outer mantle of plastic material.

A further feature according to the method of the present invention is that the bumper is manufactured by outer processing, and the outer processing takes place by means of mechanical tools. Alternatively, hydroforming can be used.

Further advantages and specific features of the present invention will be apparent from the following description taken in conjunction with the attached drawings, as well as from the appended patent claims.

BRIEF DESCRIPTION OF THE DRAWINGS

FIG. 1 is a schematic view as seen from above of a symmetrical half of a structural beam, especially a bumper beam according to the invention.

FIG. 2 is a side view of the bumper rail half according to FIG. 1.

FIG. 3 is a perspective view of a cut-out of the terminal portion of the bumper rail illustrated in FIGS. 1 and 2.

FIGS. 4, 5, 6 and 7 are cross sections taken along the lines IV—IV, V—V, VI—VI and VII—VII, respectively, in FIG. 1.

FIG. 8 is a perspective view of a bumper rail having a specifically formed terminal portion for net parallel attachment, FIGS. 8A, 8B and 8C show the various cross section forms along the bumper rail, FIGS. 8X, 8Y and 8Z show various forms of the outer wall portion.

FIG. 9 is a perspective view of a terminal portion of a bumper rail provided with attachment portions for non-net parallel attachment.

FIGS. 10–12 illustrate examples of calculation models for an embodiment of a structural beam according to the invention, the models being compiled according to the "finite element" method.

DETAILED DESCRIPTION OF THE INVENTION

Figure 12:
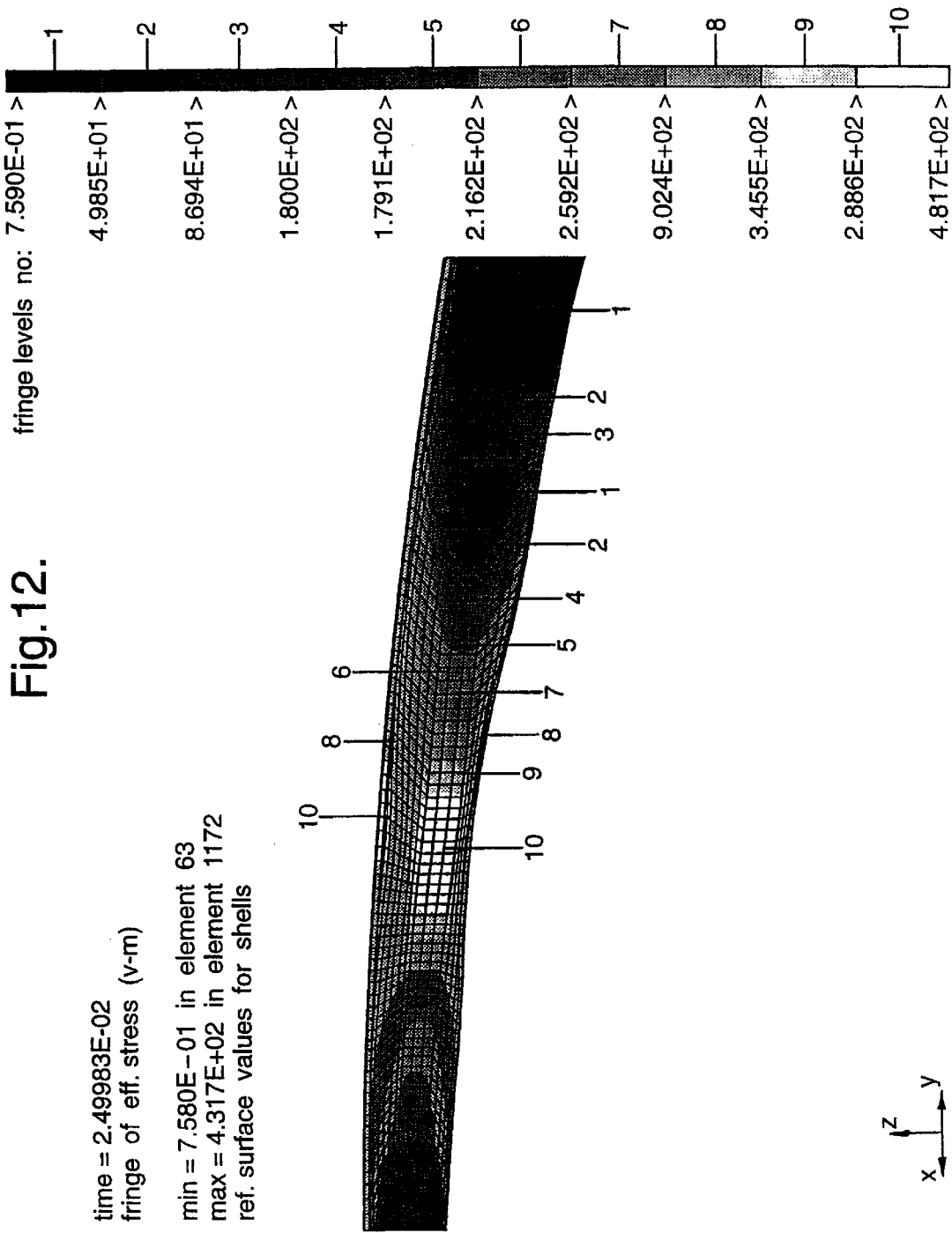

In FIGS. 1–7 there is illustrated an example of a structural beam, especially a bumper beam according to the invention. FIG. 1 schematically illustrates a view as seen from above of a symmetric half of a rail 1, whereas FIG. 2 illustrates a side view of the same rail, and FIG. 3 illustrates perspectively details of the terminal portion of the bumper rail 1 illustrated in FIGS. 1 and 2.

FIGS. 4, 5, 6 and 7 represent cross sections taken along the lines IV—IV, V—V, VI—VI, and VII—VII, respectively. in FIG. 1.

The bumper rail 1 is in FIGS. 1–7 illustrated in its finished processed form, and is as such adapted for absorbing collision energy and forces when used in a car. The bumper rail is preferably used as a bumper, but also as a supporting beam in the overall structure of the car.

The bumper 1 is made from a complete and hollow extruded blank which is manufactured from an extrudable material, for example aluminum, or any other materials or mixtures having corresponding extrudable and strength-related properties. The blank has, in its initial form, a basic cross section 2 of the type which is specifically illustrated in FIG. 4, and which comprises an outer wall portion 2a of substantially straight design and having a height H, an arched inner portion 2b as well as yoke portions 2c extending substantially perpendicularly from the outer wall portion 2a. The basic cross section 2 is on both sides of the center, see IV—IV in FIG. 1 and FIG. 4, according to the present invention. Whereas at the center portion itself, see V—V in FIG. 1 and FIG. 5, the basic cross section has been given an outwardly pressed cross section 3, whereas in the areas of each of the terminal portions, here at section VI—VI in FIG. 1, see also FIG. 6, the basic cross section 2 has been compressed or folded to a further cross section 4, which is different from the basic cross section.

In other words, the bumper rail 1 is manufactured on the basis of a basic cross section on each side of the center, and an outwardly pressed cross section at the center in relation to the basic cross section, as well as a compressed or folded cross section in the areas of each of the terminal portions.

It is to be understood that the transitions between the basic cross section 2 and the center cross section 3 and the terminal cross sections 4, respectively, is gradual and smooth, and can, of course, be varied within large ranges.

Further, it is to be understood that the outer wall portion can deviate from the wall portion 2a as illustrated here, namely by being substantially straight, or by being designed with a more or less contoured shape.

In the embodiment which is specifically illustrated in FIGS. 1–7, the cross section 3 at the center, see specifically FIG. 5, is pressed out into a substantially trapeze shaped cross section 3, comprising a straight outer wall portion 3a having substantially the same height H as the inner wall portion 2b of the intermediate cross section 2, and an inner wall portion 3b of lesser height. Inclined yoke portions 3c are also provided between the straight inner wall portion 3a and the outer wall portion 3b.

The cross section 4 at the terminal portions, see specifically FIG. 6, is in this embodiment compressed or folded so as to comprise a straight outer wall portion 4a having substantially the same height H as the outer wall portion 2a for the intermediate cross section 2, see FIG. 4, as well as an inner wall portion 4b which is folded out to a larger height Hl than the outer wall portion 4a. Intermediate arched or wavy yoke portions 4c connect the outer wall portion 4a and the inner wall portion 4b.

It is to be understood that the cross section 4 at the terminal portions, see FIG. 6, can have an inner wall portion which can be equal or less than the height corresponding to the height H for the intermediate cross section 2, all in dependence of the desired final form which the bumper or the power beam according to the present invention is to be given.

In the embodiment illustrated in FIGS. 1–7 the starting point is the cross section 2, as shown in FIG. 4. Cross section 2 constitutes a closed cross section with the front wall portion 2a and the rear wall portion 2b being provided with or comprising portions having a larger wall thickness than the wall thickness of the intermediate yoke portions 2c.

As stated in the preamble it is possible by having as a starting point a basic cross section which so to say is kept unchanged on each side of the center, at the same time as the center portion is processed into an outwardly pressed cross section at the center and a compressed or folded cross section at the side portions or terminal portions, to achieve a specifically favorable varying cross section, which renders a specifically favorable resilient effect upon collision at velocities of up to 4 km/h, and at velocities above 4 km/h it will provide favorable collision qualities. The overall profile will be able to absorb more energy even at lower weight, compared with corresponding bumper rails, for example profile based, closed bumpers.

Additionally, there is, by this form of profile rail, secured a very favorable torsional stiffness, since the hollow chamber profile is maintained and the bumper blank can be processed on the basis of one continuous working blank.

It is to be understood that the profile or bumper rail 1 can be made substantially symmetrical about a center plane running in the longitudinal direction of the vehicle, and the profile or bumper can be provided with an outer mantle of plastic material.

If the structural beam according to the invention is to be used as a structure element in the vehicle as such, this symmetrical design can appropriately be alleviated.

Appropriately, the terminal portions may merge into attachment portions, and this is specifically illustrated in FIGS. 8 and 9. The attachment portions are provided with a net parallel surface against side beams of the vehicle.

FIG. 8, with its sections 8A–8C, illustrates a specific design of the terminal portions for net parallel attachment, and the sections illustrated in FIGS. 8A, 8B and 8C are designed substantially in accordance with the sections as discussed in connection with FIGS. 4, 5 and 6. However, in FIG. 8C there are illustrated alternative "a" and alternative "b" for various bendings of the processed section 5 at the terminal portions.

Further, there is in FIG. 8X illustrated a variant of the basic cross section comprising an outer portion which deviates from being straight, but which rather has an outwardly bulging contour. FIG. 8Y illustrates an asymmetrical outer portion, and FIG. 8Z illustrates a substantially mirror symmetrical section having an inwardly bulging contour.

In FIG. 9 there is illustrated a perspective view of a terminal portion of a bumper rail provided with attachment portions for non-net parallel attachment.

It is to be understood that the processing of the blank can take place by first stretching the blank to the basic shape, especially a modestly arched shape in the longitudinal direction of the blank. Then the profile is simultaneously processed at the center portion and the terminal portions, but with an opposite processing direction for the portions.

Alternatively, the processing of the blank may be achieved by means of hydroforming.

In FIGS. 10–12 there is illustrated examples of calculated models of an embodiment of a structural beam according to the invention. FIGS. 10 and 11 illustrate various perspective views of the model which is compiled according to the "finite element" method. FIG. 12 illustrates the stress distribution in load case "barrier" and then more specifically equivalent stresses at "fringe" levels.

I claim:

1. A bumper for a vehicle, said bumper comprising:
an elongated body which, upon collision, is adapted to absorb collision energy and forces,
said elongated body being prepared from a hollow blank so as to have a generally arched longitudinal extension which is provided with different cross sections along its length,
wherein said elongated body has a compressed or folded cross section at each of terminal end portions thereof, said elongated body having a central portion and intermediate portions on either side of said central portion,
wherein each of said intermediate portions has a basic cross section which is substantially unchanged from the cross section of the hollow blank, and said central portion has an outwardly pressed cross section relative to said basic cross sections of said intermediate portions.

2. The bumper as claimed in claim 1, wherein:
said basic cross section of each of said intermediate portions comprises an outer wall portion, an arched inner wall portion, and yoke portions extending substantially perpendicularly from said outer wall portion;
said cross section at said central portion is substantially trapeze-shaped, and said cross section at said central portion comprises an outer wall portion having substantially the same height as said cross sections at said intermediate portions, and an inner wall portion having a height which is less than the height of said outer wall portion, and substantially slanted yoke portions connecting said inner and outer wall portions of said central portion; and
said cross section at each of said terminal portions comprises an outer wall portion having substantially the same height as said cross sections of said intermediate portions, an inner wall portion, and intermediate yoke portions connecting said inner and outer wall portions of said terminal portions.

3. The bumper as claimed in claim 1, wherein said inner and outer wall portions of each of said intermediate portions have a wall thickness which is larger relative to a wall thickness of said yoke portions of said each of said intermediate portions.

4. The bumper as claimed in claim 1, further comprising attachment portions connected to said terminal portions, respectively, each of said attachment portions having a surface which is parallel relative to a surface of a vehicle side beam.

5. The bumper as claimed in claim 1, wherein said elongated body is formed so as to be substantially symmetrical about a center plane running in a longitudinal direction of the vehicle, and said elongated body includes an outer mantle of plastic material.

6. A method of fabricating a vehicular bumper, said method comprising:
processing a hollow blank so as to form an arch-shaped elongated body having a generally uniform cross section, said elongated body being adapted to absorb collision energy and forces;
processing opposite terminal end portions of said arch-shaped elongated body so as to form a compressed cross section at said terminal end portions; and
processing a central portion of said arch-shaped elongated body so as to form an outwardly pressed cross section at said central portion,
wherein the basic cross section at intermediate portions of said arch-shaped elongated body, located on opposite sides of said central portion, are substantially unchanged following the processing of said central portion and said terminal end portions.

7. The method as claimed in claim 6, wherein the shape of said cross section at said central portion, following said processing operation, is substantially trapeze-shaped and comprises an outer wall portion having substantially the same height as said cross sections at said intermediate portions, and an inner wall portion having a height which is less than the height of said outer wall portion, and substantially slanted yoke portions connecting said inner and outer wall portions of said central portion; and said cross section at each of said terminal portions, following said processing operation, comprises an outer wall portion having substantially the same height as said cross sections of said intermediate portions, an inner wall portion, and intermediate yoke portions connecting said inner and outer wall portions of said terminal portions.

8. The method as claimed in claim 6, wherein said inner and outer wall portions of each of said intermediate portions have a wall thickness which is larger relative to a wall thickness of said yoke portions of said each of said intermediate portions.

9. The method as claimed in claim 6, further comprising forming an attachment portion at each of said terminal portions, wherein each of said terminal portions merges into said attachment portion which is designed so as to have a surface which is parallel relative to a surface of a vehicle side beam.

10. The method as claimed in claim 6, further comprising processing said elongated body so as to be substantially symmetrical about a center plane running in a longitudinal direction of the vehicle, and forming an outer mantle of plastic material on said elongated body.

11. The method as claimed in claim 6, wherein said elongated body is processed by mechanical tools.

12. The method as claimed in claim 6, wherein said processing of said blank initially includes stretching or pressing said blank into said arched-shaped elongated body.

13. The method as claimed in claim 6, wherein said blank is processed by hydroforming.

* * * * *